(12) United States Patent
Roberts et al.

(10) Patent No.: US 8,913,171 B2
(45) Date of Patent: Dec. 16, 2014

(54) METHODS AND SYSTEMS FOR DYNAMICALLY PRESENTING ENHANCED CONTENT DURING A PRESENTATION OF A MEDIA CONTENT INSTANCE

(75) Inventors: Brian F. Roberts, Dallas, TX (US); Donald H. Relyea, Dallas, TX (US); Anthony M. Lemus, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 507 days.

(21) Appl. No.: 12/948,228

(22) Filed: Nov. 17, 2010

(65) Prior Publication Data

US 2012/0120296 A1 May 17, 2012

(51) Int. Cl.
- *H04N 5/222* (2006.01)
- *H04N 21/41* (2011.01)
- *H04N 1/00* (2006.01)

(52) U.S. Cl.
CPC .... *H04N 21/4126* (2013.01); *H04N 2201/0084* (2013.01); *H04N 1/00347* (2013.01); *H04N 2201/0089* (2013.01)
USPC .................................................. 348/333.02

(58) Field of Classification Search
CPC .... H04N 5/232; H04N 5/772; H04N 5/23293
USPC ............. 348/207.99, 207.1, 222.1, 161, 158, 348/333.01, 333.02, 333.05, 333.11, 348/333.12, 633
See application file for complete search history.

(56) References Cited

U.S. PATENT DOCUMENTS

| | | | |
|---|---|---|---|
| 6,037,936 A * | 3/2000 | Ellenby et al. | 715/764 |
| 6,067,112 A * | 5/2000 | Wellner et al. | 348/211.4 |
| 7,248,285 B2 * | 7/2007 | Needham | 348/207.1 |
| 7,680,324 B2 * | 3/2010 | Boncyk et al. | 382/165 |
| 8,026,931 B2 * | 9/2011 | Sun et al. | 345/632 |
| 8,098,881 B2 * | 1/2012 | Camp et al. | 382/100 |
| 8,312,017 B2 * | 11/2012 | Martin et al. | 707/736 |
| 8,483,754 B2 * | 7/2013 | Rao et al. | 455/556.1 |
| 2002/0102966 A1 * | 8/2002 | Lev et al. | 455/412 |
| 2002/0167484 A1 * | 11/2002 | Hatanaka et al. | 345/156 |
| 2004/0113885 A1 * | 6/2004 | Genc et al. | 345/156 |
| 2004/0179107 A1 * | 9/2004 | Benton | 348/211.99 |
| 2004/0208372 A1 * | 10/2004 | Boncyk et al. | 382/181 |
| 2005/0185060 A1 * | 8/2005 | Neven, Sr. | 348/211.2 |
| 2006/0002607 A1 * | 1/2006 | Boncyk et al. | 382/165 |
| 2006/0240862 A1 * | 10/2006 | Neven et al. | 455/550.1 |
| 2006/0262188 A1 * | 11/2006 | Elyada et al. | 348/143 |
| 2008/0279481 A1 * | 11/2008 | Ando | 382/306 |
| 2009/0232354 A1 * | 9/2009 | Camp et al. | 382/103 |
| 2009/0285484 A1 * | 11/2009 | Mallinson et al. | 382/183 |
| 2010/0199232 A1 * | 8/2010 | Mistry et al. | 715/863 |
| 2011/0313856 A1 * | 12/2011 | Cohen et al. | 705/14.49 |

OTHER PUBLICATIONS http://www.pranavmistry.com/projects/sixthsense/, retrieved from archive.org with an archive date of Aug. 6, 2009.*

* cited by examiner

*Primary Examiner* — Nicholas Giles

(57) ABSTRACT

Exemplary methods and systems for dynamically presenting enhanced content during a presentation of a media content instance are disclosed herein. An exemplary method includes an enhanced content presentation system detecting, within a view acquired by a camera, a display device presenting a media content instance, displaying the view acquired by the camera on a display screen of a mobile device associated with the camera, and dynamically presenting, within the displayed view, one or more display elements representative of one or more enhanced content instances associated with the media content. Corresponding methods and systems are also disclosed.

25 Claims, 11 Drawing Sheets

US 8,913,171 B2

METHODS AND SYSTEMS FOR DYNAMICALLY PRESENTING ENHANCED CONTENT DURING A PRESENTATION OF A MEDIA CONTENT INSTANCE

BACKGROUND INFORMATION

Advances in electronic communications technologies have interconnected people and allowed for distribution of information perhaps better than ever before. To illustrate, personal computers, handheld devices, mobile phones, set-top box devices, and other electronic access devices are increasingly being used to access, store, download, share, and/or otherwise process various types of media content (e.g., video, audio, photographs, and/or multimedia).

Many users of such access devices would be interested in accessing enhanced content associated with a media content instance while the media content instance is being presented by way of one of the above-mentioned access devices if given the opportunity to do so. For example, many users would enjoy accessing additional information associated with a particular scene in a television program, purchasing items similar to those included in the television program, and/or discovering additional media content featuring various characters included in the television program while the television program is being presented. However, it is undesirable to utilize the same display screen being used to present the media content instance to simultaneously present enhanced content associated with the media content instance. For example, simultaneously displaying enhanced content on the same display screen as the media content instance takes away a portion of the display screen that could otherwise be utilized to present a larger display of the media content instance. In addition, utilizing a second device to access enhanced content can also be undesirable. For example, current implementations utilizing secondary devices require that the user must provide substantial user input (e.g., enter one or more keywords into a search engine, navigate to a website associated with the media content instance, etc.) in order to access such enhanced content. This is cumbersome, distracting, and/or difficult to perform for many users while they watch or otherwise experience the media content instance. Hence, many users do not even attempt to access enhanced content associated with a media content instance while the media content instance is being presented.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Figure 1:
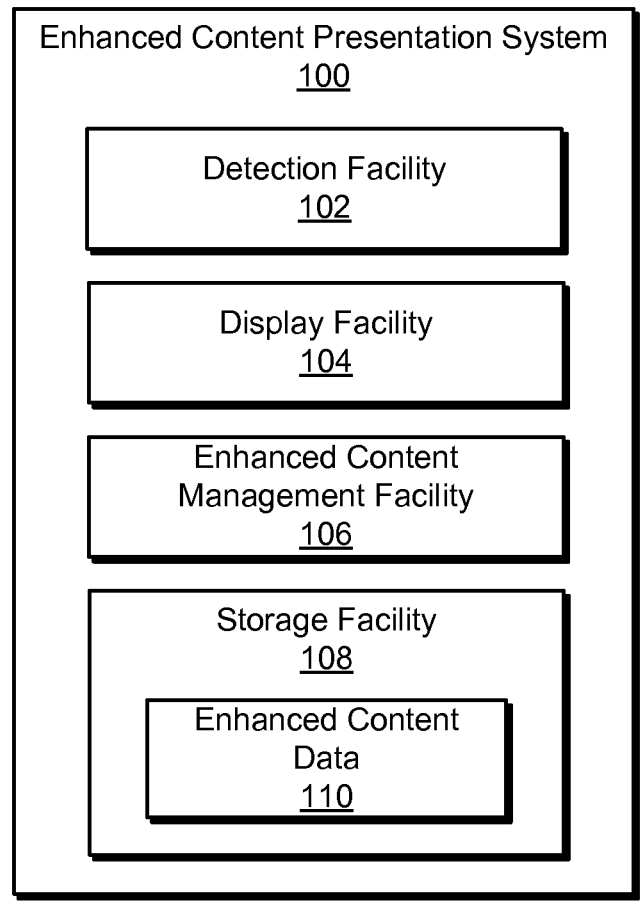
FIG. 1 illustrates an exemplary enhanced content presentation system according to principles described herein.

Exemplary methods and systems for dynamically presenting enhanced content during a presentation of a media content instance are disclosed herein. As described in more detail below, an enhanced content presentation system may detect, within a view acquired by a camera associated with a mobile device, a display device presenting a media content instance, display the view acquired by the camera on a display screen of the mobile device, and dynamically present, within the displayed view, one or more display elements representative of one or more enhanced content instances associated with the media content instance. In this or a similar manner, the exemplary systems and methods described herein may allow a user to access, by way of a mobile device, enhanced content related to a media content instance being presented by a separate display device (e.g., a television device).

As will be described in more detail below, the methods and systems disclosed herein may be configured to augment the reality of a user's physical, real-world environment during a presentation of a media content instance on a display device. For example, rather than occupying any portion of a display screen of the display device to present enhanced content, the systems and methods disclosed herein allow a user to utilize a camera and a display screen associated with a mobile device (e.g., a tablet computer, a mobile phone device, etc.) to augment the reality of the user's physical environment and access enhanced content associated with the media content instance being presented on the display device.

To illustrate, a mobile device may display, on a display screen, a view of a user's physical environment (e.g., a view acquired by a camera associated with the mobile device) including at least a portion of a display device being used to present a media content instance to the user. In conjunction with the displayed view, the mobile device may dynamically present one or more display elements on the display screen (e.g., overlaid onto and/or included in place of a portion or portions of the acquired/displayed view). In some examples, the one or more display elements may form and/or be presented within a virtual user interface. A user may then utilize the presented one or more display elements to select, access, view, and/or interact with enhanced content associated with the media content instance, as will be explained in more detail below.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, image, photograph, sound, or any segment, component, or combination of these or other forms of media content that may be viewed or otherwise experienced by a user.

A media content instance may include and/or be associated with one or more attributes. For example, a media content instance may be associated with and/or include one or more video attributes (e.g., images, portions of images, colors, objects, video quality, people, and/or any other suitable attributes associated with and/or depicted within a video portion of the media content instance), one or more audio attributes (e.g., sounds, songs, names, voices, and/or any other suitable audio attributes associated with or included within an audio portion of the media content instance), one or more text attributes (e.g., one or more words—such as the names of people, places, things, activities, etc.—included within a closed caption stream associated with the media content instance), one or more metadata attributes (e.g., metadata representative of a title of the media content instance, a name of one or more people associated with the media content instance—such as actors, artists, directors, producers, etc.—a subject of the media content instance, a synopsis of the media content instance, a setting of the media content instance, a theme of the media content instance, a format of the media content instance, and/or any other suitable metadata associated with the media content instance), and/or any other suitable attributes associated with the media content instance. The attributes associated with a media content instance may be detected and utilized to identify a media content instance and/or to select enhanced content associated with the media content instance, as will be explained in more detail below.

As used herein, the term "display element" refers to text (e.g., one or more words, characters, numbers, symbols, etc.), one or more images, one or more videos, one or more graphics, animation content (e.g., Flash content), one or more hyperlinks, and/or any other content that may be visually displayed in a graphical user interface and that may be representative of an enhanced content instance.

As used herein, the terms "enhanced content" and "enhanced content instance" may include any content related to a particular media content instance being presented. For example, an enhanced content instance may include, but is not limited to, an advertisement, a communication (e.g., a communication provided by way of a social media outlet), a video (e.g., a trailer, a video clip), an article (e.g., an online newspaper article), music, a map, a web page, a web-based search results list (e.g., a Google search results list), and/or any other content as may serve a particular implementation.

Enhanced content instances may be obtained from one or more enhanced content sources. For example, enhanced content instances may be obtained from social media sources (e.g., Facebook, Twitter, YouTube, blogs, Wikipedia, etc.), media content sources (e.g., iTunes, Netflix, etc.), retail product sources (e.g., Wal-Mart, Borders, Amazon, etc.), advertisement sources (e.g., retailers), Internet search engines (e.g., Google, Bing, etc.), news sources (e.g., CNN, Wall Street Journal, etc.), and/or any other suitable enhanced content source.

FIG. 1 illustrates an exemplary enhanced content presentation system 100 (or simply "system 100"). As will be described in more detail below, system 100 may be configured to facilitate the presentation of enhanced content to a user during the presentation of a media content instance associated with the enhanced content.

System 100 may include, but is not limited to, a detection facility 102, a display facility 104, an enhanced content management facility 106 (or simply "management facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

As will be described in more detail below, detection facility 102 may be configured to detect, within a view acquired by a camera, a display device presenting a media content instance. For example, detection facility 102 may be configured to detect that a camera associated with a mobile device (e.g., a camera built into or communicatively coupled to the mobile device) is acquiring or has acquired a view (e.g., an image or series of images) that includes a display device (e.g., a television device) that is presenting a media content instance. In some examples, detection facility 102 may be configured to visually detect the display device within the acquired view (e.g., based on a shape of the display device, a size of the display device, light emitted by a display screen of the display device, etc.). In additional or alternative examples, detection facility 102 may be configured to detect a presence and/or position of one or more peripheral edges of a display device and/or a corresponding display screen within the acquired view.

In some examples, detection facility 102 may be configured to detect changes in an acquired view in any suitable manner. For example, detection facility 102 may be configured to detect movement of one or more objects within the acquired view (e.g., relative movement of a display device within the acquired view). Additionally or alternatively, detection facility 102 may be configured to detect one or more movements of the camera and/or associated mobile device being used to acquire the view. For example, detection facility 102 may be configured to utilize and/or communicate with one or more motion sensors (e.g., accelerometers, gyroscopes, etc.) to detect movement of the camera and/or mobile device and thereby detect and/or associate detected movement with corresponding changes in the acquired view.

Detection facility 102 may be further configured to detect and/or identify the media content instance being presented on the display device and/or any suitable information associated with the media content instance. For example, detection facility 102 may be configured to detect one or more attributes associated with the media content instance (e.g., one or more visual attributes, audio attributes, text attributes, metadata attributes, and/or any other suitable attributes associated with the media content instance) and/or utilize the detected attributes to identify the media content instance, one or more persons (e.g., actors, news anchors, athletes, etc.) appearing in, speaking in, mentioned in, and/or otherwise associated with the media content instance, one or more places (e.g., cities, countries, etc.) appearing in, mentioned in, and/or otherwise associated with the media content instance, one or more objects (e.g., advertised products, animals, cartoon characters, etc.) appearing in, heard in, and/or otherwise associated with the media content instance, one or more songs played in or otherwise associated with the media content instance, and/or any other suitable information associated with the media content instance. Detection facility 102 may be configured to detect and/or identify the information associated with the media content instance in any suitable manner. For example, detection facility 102 may be configured to utilize any suitable image recognition, audio recognition, text analysis, and/or data processing technologies, algorithms, and/or processes to detect, obtain, and/or identify information associated with a media content instance based on images associated with the media content instance (e.g., images received by way of a camera), audio associated with the media content instance (e.g., audio received by a microphone), text associated with the media content instance (e.g., closed caption text), and/or metadata associated with the media content instance (e.g., metadata received from a set-top box device presenting the media content instance by way of the display device and/or from a content provider associated with the media content device).

In some examples, detection facility 102 may be configured to request information associated with a media content instance in response to a detection by detection facility 102 of the presence of a display device within an acquired view. For example, in response to detecting a display device within an acquired view, detection facility 102 may be configured to transmit a signal (e.g., a wireless signal such as an infra-red signal) configured to request information associated with a media content instance being presented on the display device. To illustrate, detection facility 102 may be configured to transmit the request to the display device itself, to a media content access device (e.g., a set-top box device) associated with the display device, to a remote device (e.g., a remote server associated with a content provider and/or a third-party program guide information provider), and/or any other suitable source of information associated with the media content instance. In response to the transmitted signal, detection facility 102 may receive data representative of information associated with the media content instance (e.g., metadata) and use the received data to identify the media content instance, one or more aspects associated with the media content instance (e.g., one or more actors in the media content instance), and/or any other suitable information.

Detection facility 102 may be further configured to detect a presentation transition from one media content instance to another. For example, detection facility 102 may be configured to detect and/or identify a first media content instance being presented on a display device and then detect and/or identify that a second media content instance is being presented on the display device.

To illustrate the functionality of detection facility 102 described above, a user watching a movie on a television device may use a mobile phone device having a built-in camera to acquire a view of the user's physical environment including at least a portion of the television device. Detection facility 102 may be configured to detect/identify a presence of the television device within the acquired view, a position of the television device within the acquired view, the position of one or more peripheral edges of the television device, a title of the movie, one or more actors appearing in the movie, and/or any other suitable information associated with the television device and/or the movie being presented. Detection facility 102 may also be configured to detect movements of the mobile phone device and/or corresponding changes in the acquired view. As will be explained in more detail below, based on the information detected/obtained by detection facility 102, system 100 may display the acquired view and/or dynamically present enhanced content (e.g., enhanced content associated with the movie) to the user on a display screen of the mobile phone device.

Display facility 104 may be configured to display a view acquired by a camera. For example, display facility 104 may be configured to utilize a display screen of a mobile device to display a view acquired by a camera associated with the mobile device. To illustrate, display facility 104 may be configured to display a depiction of a display device and/or any other elements of a user's physical environment on a display screen of the mobile device (e.g., in accordance with an acquired view of the user's physical environment). In some examples, display facility 104 may be configured to update (e.g., at a predetermined frequency or continuously) a displayed view in accordance with any changes in an acquired view. For example, as a user moves a camera associated with the mobile device (e.g., pans left or right and/or tilts up or down), display facility 104 may update the displayed view to correspond to changes in the acquired view (e.g., so that at any given time, the displayed view accurately represents the acquired view).

To illustrate, and referring again to the example of a user watching a movie on a television device and using a mobile phone device's camera to acquire a view the television device, display facility 104 may be configured to display a depiction of the acquired view (e.g., including a depiction of the television device) on a display screen of the mobile phone device. Additionally or alternatively, in response to movements of the camera, display facility 104 may be configured to update the displayed view to correspond to any changes in the acquired view. For example, display facility 104 may be configured to reposition a depiction of the television device within the displayed view as a user moves the camera to reposition the television device within the acquired view. As will be explained in more detail below, in accordance and/or conjunction with the displayed view of the user's physical environment and/or changes therein, system 100 may dynamically present enhanced content to the user.

Management facility 106 may be configured to dynamically present, within a displayed view, one or more display elements representative of one or more enhanced content instances. For example, management facility 106 may be configured to present one or more display elements on a display screen of a mobile device in conjunction with a displayed view (e.g., concurrently with, overlaid onto, and/or in place of one or more portions of a view acquired by the associated camera and/or displayed by display facility 104). The one or more display elements may be representative of and/or selectable by a user to access any suitable enhanced content (e.g., enhanced content instances associated with a media content instance being displayed on the display device).

Management facility 106 may be configured to present the one or more display elements within the displayed view in any suitable manner. In some examples, management facility 106 may be configured to present the one or more display elements in accordance with and/or relative to the position(s) of other items displayed on a display screen (e.g., in accordance with and relative to a depiction of a display device). For example, management facility 106 may be configured to organize the one or more display elements around and/or outside of one or more peripheral edges of a depiction of a display device displayed on the display screen of the mobile device. In additional or alternative examples, management facility 106 may be configured to present the one or more display elements at any other suitable position within the displayed view (e.g., at least partially overlaid onto the depiction of the display device on the display screen of the mobile device). In certain embodiments, each display element may be associated with a particular portion of the media content instance and may be positioned in conjunction with the corresponding portion (e.g., positioned near and/or otherwise visually linked to a particular object or person appearing in the media content instance).

Management facility 106 may be configured to dynamically reposition the one or more display elements within a displayed view in response to one or more changes in the acquired and/or displayed views. For example, as a user repositions the camera, management facility 106 may reposition the one or more display elements within the displayed view in response to and in accordance with the repositioning of the camera. To illustrate, in response to changes in the acquired/ displayed view, management facility 106 may be configured to dynamically reposition the one or more display elements to maintain the positions of the display elements relative to a depiction of a display device on the display screen of the mobile device (e.g., management facility 106 may dynamically reposition the display elements to remain organized around a peripheral edge of the display device despite movement of the display device within the acquired/displayed view).

Management facility 106 may be further configured to dynamically update and/or replace one or more display elements presented within a displayed view. For example, management facility 106 may be configured to replace a particular display element representative of a particular enhanced content instance with another display element representative of another enhanced content instance. To illustrate, management facility 106 may be configured to update and/or replace a display element after a predetermined amount of time, in response to a change from one portion of a media content instance to another, in response to a change from one media content instance to another, and/or in any other suitable manner.

Management facility 106 may be configured to dynamically present and/or remove display elements in response to movement of the mobile device/camera and/or corresponding changes in the acquired and/or displayed views. For example, management facility 106 may be configured to dynamically present one or more display elements in response to a user moving the mobile device and/or camera to acquire a view of one or more areas surrounding a display device. To illustrate, as a user pans a camera around to acquire views of the areas around a display device and as display facility 104 displays the corresponding acquired views on a display screen of the mobile device, management facility 106 may be configured to dynamically present one or more display elements on the display screen within the areas around the display device as depicted on the display screen of the mobile device. To illustrate further, in response to a user panning a camera from left to right to acquire a view of an area to the right of a display device and in conjunction with display facility 104 displaying a depiction of the area to the right of the display device on a display screen of a mobile device, management facility 106 may be configured to present one or more display elements on the display screen and within the area to the right of the display device. Accordingly, management facility 106 may be configured to augment the reality of the user's physical environment by dynamically presenting virtual content and/or a virtual interface in conjunction with a depiction of the user's physical environment on the display screen of the mobile device.

Management facility 106 may be configured to remove one or more previously presented display elements and/or present one or more additional display elements in response to movement of a mobile device and/or camera and/or in accordance with corresponding changes in the acquired and/or displayed views. To illustrate, after utilizing the camera to acquire a first view of the user's physical environment including an area to the right of the display device, and after viewing a first set of display element presented within the displayed depiction of the area to the right of the display device, the user may then reposition the camera to acquire a second view of the user's physical environment that includes an area to the left of the display device (e.g., by panning the camera from right to left). In response to the repositioning, management facility 106 may remove the first set of display elements from the displayed view (e.g., as the area to the right of the display device disappears from the acquired and/or displayed views) and/or dynamically present a second set of display elements within the area to the left of the display device in the displayed view (e.g., as the area to the left of the display device comes into view on the display screen of the mobile device). The foregoing process may be continued, thereby allowing a user to view additional and/or alternative display elements and access corresponding enhanced content by repositioning the mobile device and/or camera to acquire additional views of the user's physical environment.

In some examples, management facility 106 may be configured to selectively present display elements associated with a particular type and/or source of enhanced content in accordance with a particular area surrounding a display device, a particular peripheral edge of a display device, and/or a particular direction of movement of a camera. For example, each area around the display device, each peripheral edge of the display device, and/or each direction of camera movement may be associated with a different type and/or source of enhanced content and management facility 106 may be configured to dynamically present display elements representative of the different types and/or sources of enhanced content in accordance with the associated area, peripheral edge, and/or direction. To illustrate, management facility 106 may be configured to present display elements representative of video content to the right of the display device, display elements representative of image content above the display device, display elements representative of enhanced content from a particular social media source (e.g., Facebook) to the left of the display device, and/or display elements representative of enhanced content from a particular retail product source (e.g., Amazon) below the display device. Accordingly, a user may selectively reposition a camera as desired to access enhanced content from a particular source and/or of a particular type. In additional or alternative examples, a user (e.g., an end user) may configure management facility 106 to present enhanced content of a particular desired type and/or from a particular desired source in accordance with any suitable area surrounding a display device, any peripheral edge of the display device, and/or any direction of movement of a camera and/or acquired view.

Management facility 106 may be configured to display one or more display elements during a time period associated with a presentation of a particular portion of the media content instance. For example, management facility 106 may be configured to display a particular display element representative of a particular enhanced content instance associated with a particular portion of the media content instance during a time period associated with a presentation of the particular portion of the media content instance. To illustrate, management facility 106 may be configured to display the particular display element concurrently with and/or for an amount of time following the presentation of the particular portion of the media content instance.

Management facility 106 may be configured to select a plurality of enhanced content instances associated with a media content instance. For example, management facility 106 may be configured to select the enhanced content instances based on information detected/obtained by detection facility 102 (e.g., based on one or more visual attributes, one or more audio attributes, one or more text attributes, and/or one or more metadata attributes associated with the media content instance). In some examples, management facility 106 may be configured to conduct one or more searches (e.g., parallel thread searches) of one or more enhanced content sources based on information received from detection facility 102. In additional or alternative examples, management facility 106 may be configured to select the enhanced content instance in any other suitable manner. Management facility 106 may then dynamically present one or more display elements representative of one or more of the selected enhanced content instances during the presentation of the media content instance, as disclosed in more detail herein.

Management facility 106 may be configured to select enhanced content instances at any suitable time. For example, management facility 106 may be configured to select the enhanced content instances prior to a presentation of a corresponding media content instance, during the presentation of the corresponding media content instance, and/or at any other suitable time. To illustrate, management facility 106 may be configured to dynamically select one or more enhanced content instances in real time during the presentation of a media content instance. In some examples, a user may be presented with a "stream" of display elements that may be constantly changing to display new display elements as new enhanced content instances are selected by management facility 106. For example, the display elements may be sequentially replaced with new display elements as corresponding enhanced content is selected and/or becomes available and/or as corresponding portions of the media content instance are presented. To illustrate, management facility 106 may select a first enhanced content instance in accordance with a first detected attribute associated with a first portion of a media content instance and present a first display element representative of the first enhanced content instance during a time period associated with a presentation of the first portion of the media content instance. Thereafter, management facility 106 may select a second enhanced content instance in accordance with a second detected attribute associated with a second portion of a media content instance and replace the first display element with a second display element representative of the second enhanced content instance during a time period associated with a presentation of the second portion of the media content instance.

Management facility 106 may be further configured to provide a user with access to the one or more enhanced content instances represented by the one or more display elements. For example, in response to a selection by a user of a particular display element representative of a particular enhanced content instance, management facility 106 may be configured to provide the user with access to the particular enhanced content instance. In some examples, management facility 106 may be configured to present the particular enhanced content instance on the display screen of the mobile device. Additionally or alternatively, management facility 106 may be configured to present the enhanced content instance on the display device (e.g., by directing a media content presentation device associated with the display device, such as a set-top box device, to present the enhanced content instance).

In some examples, management facility 106 may be user configurable. For example, a user may configure how management facility 106 presents display elements within a display screen of a mobile device (e.g., the user may select a preferred position to present the one or more display elements) and/or how management facility 106 selects enhanced content instances (e.g., the user may select one or more preferred enhanced content sources from which to select the enhanced content instances). In additional or alternative examples, management facility 106 may be user configurable in any other suitable manner.

To illustrate the foregoing, and referring again to the previous example regarding a user watching a movie on a television device, in addition to the television device being displayed on the display screen of the mobile phone device, management facility 106 may be configured to dynamically present one or more display elements around one or more peripheral edges of the television device within the displayed view. The one or more display elements may be representative of one or more enhanced content instances associated with the movie being presented on the television device. In some examples, management facility 106 may dynamically reposition, update, and/or replace the one or more display elements in response to corresponding changes in the acquired and/or displayed views. The user may then selectively utilize the presented one or more display elements to access and/or interact with the corresponding enhanced content.

Storage facility 108 may be configured to maintain enhanced content data 110 representative of one or more enhanced content instances. Storage facility 108 may be configured to maintain additional or alternative data as may serve a particular implementation.

Figure 2:
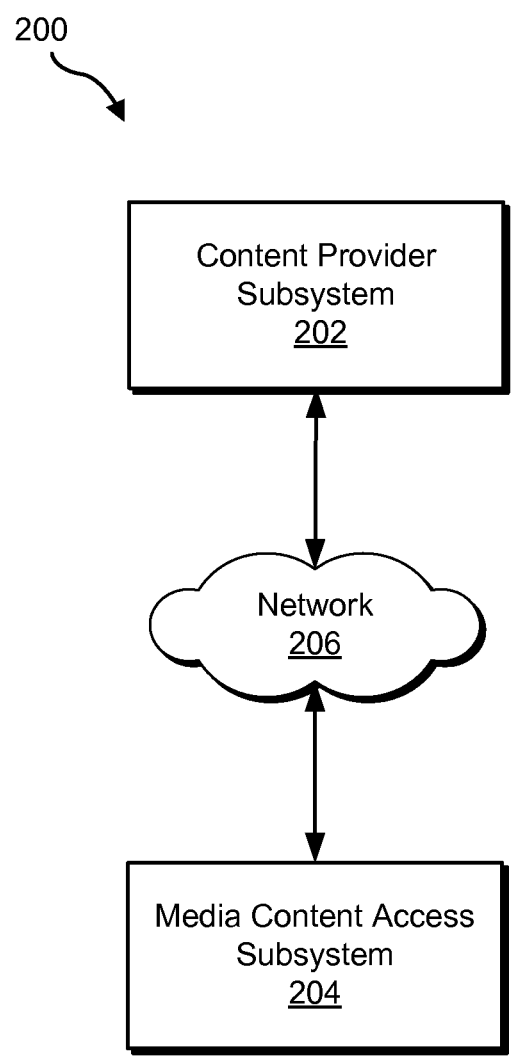
FIG. 2 illustrates an exemplary implementation of the system of FIG. 1 according to principles described herein.

FIG. 2 illustrates an exemplary implementation 200 of system 100 wherein a content provider subsystem 202 (or simply "provider subsystem 202") is communicatively coupled to a media content access subsystem 204 (or simply "access subsystem 204"). As will be described in more detail below, detection facility 102, display facility 104, management facility 106, and storage facility 108 may each be implemented on one or both of provider subsystem 202 and access subsystem 204.

Provider subsystem 202 and access subsystem 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, provider subsystem 202 and access subsystem 204 may communicate via a network 206, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between provider subsystem 202 and access subsystem 204. Communications between provider subsystem 202 and access subsystem 204 may be transported using any one of the above-listed networks, or any combination or sub-combination of the above-listed networks.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

In some examples, provider subsystem 202 may be configured to generate or otherwise provide media content (e.g., in the form of one or more media content streams including one or more media content instances) to access subsystem 204. Provider subsystem 202 may additionally or alternatively be configured to provide enhanced content to access subsystem 204.

Access subsystem 204 may be configured to facilitate access by a user to media content received from provider subsystem 202. To this end, access subsystem 204 may present the media content for experiencing (e.g., viewing) by a user, record the media content, and/or analyze data associated with the media content (e.g., analyze a stream of text and/or metadata associated with the media content). Presentation of the media content may include, but is not limited to, displaying, playing, or otherwise presenting the media content, or one or more components of the media content, such that the media content may be experienced by the user.

Additionally or alternatively, access subsystem 204 may be configured to provide a user with access to enhanced content associated with media content being presented. For example, access subsystem 204 may be configured to display one or more display elements representative of one or more enhanced content instances associated with a media content instance during the presentation of the media content instance. In some examples, access subsystem 204 may display the one or more display elements and/or the corresponding enhanced content instances on a display separate from a display used to present the media content instance.

In certain embodiments, system 100 may be implemented entirely by or within provider subsystem 202 or access subsystem 204. In other embodiments, components of system 100 may be distributed across provider subsystem 202 and access subsystem 204. For example, access subsystem 204 may include a client (e.g., a client application) implementing one or more of the facilities of system 100.

Provider subsystem 202 may be implemented by one or more computing devices. For example, provider subsystem 202 may be implemented by one or more server devices. Additionally or alternatively, access subsystem 204 may be implemented as may suit a particular implementation. For example, access subsystem 204 may be implemented by one or more media content access devices, which may include, but are not limited to, a set-top box device, a DVR device, a media content processing device, a communications device, a mobile access device (e.g., a mobile phone device, a handheld device, a laptop computer, a tablet computer, a personal-digital assistant device, a camera device, etc.), a personal computer, a gaming device, a television device, and/or any other device configured to perform one or more of the processes and/or operations described herein.

Figure 3:
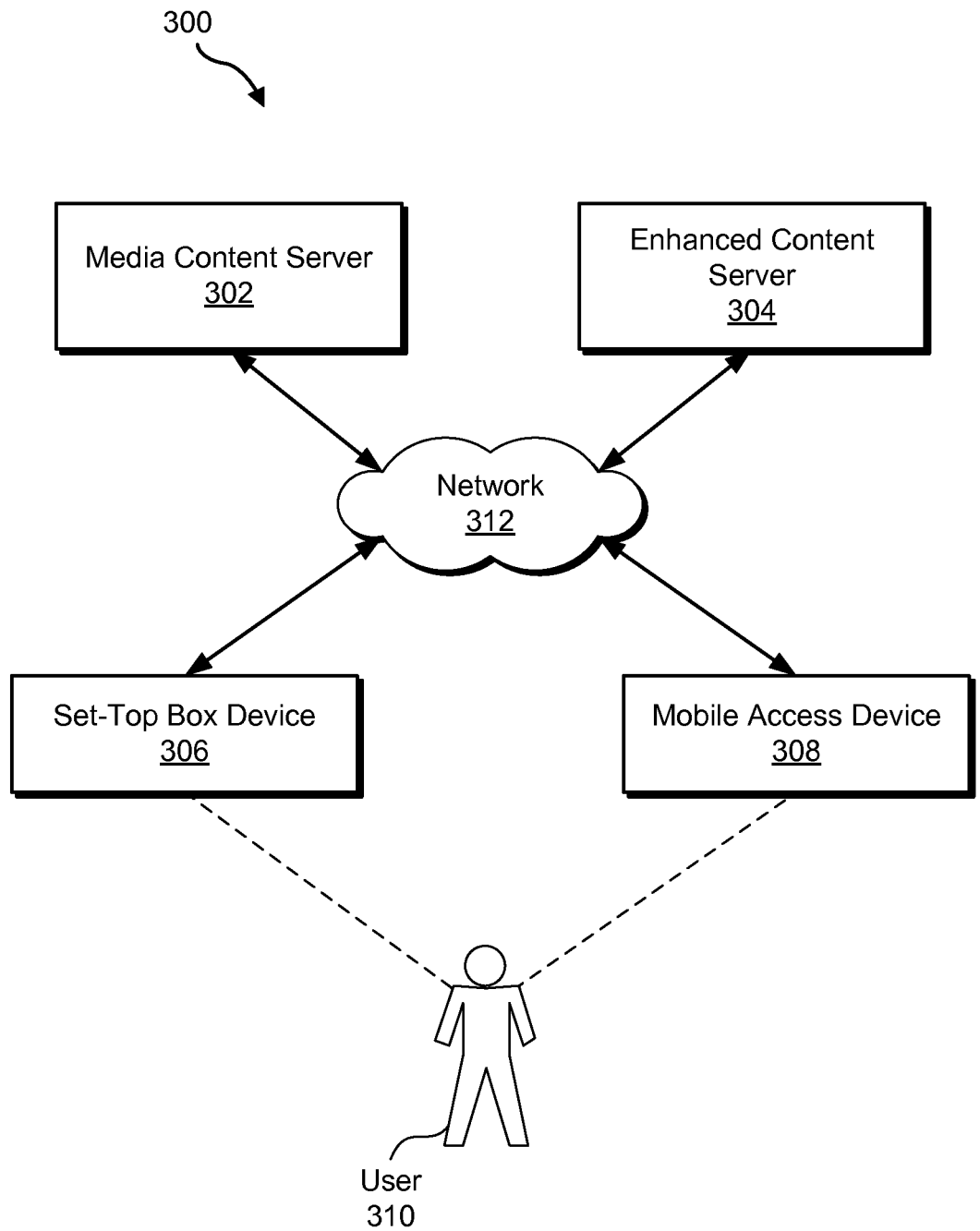
FIG. 3 illustrates another exemplary implementation of the system of FIG. 1 according to principles described herein.

To illustrate, FIG. 3 shows another exemplary implementation 300 of system 100 wherein provider subsystem 202 is implemented by a media content server 302 and an enhanced content server 304, and access subsystem 204 is implemented by a set-top box device 306 (or simply "STB device 306") and a mobile access device 308 (or simply "mobile device 308"). Both STB device 306 and mobile device 308 may be associated with (e.g., used by) a user 310. Implementation 300 may additionally or alternatively include any other type of server and/or access device as may serve a particular implementation.

In some examples, media content server 302 may be configured to maintain and/or provide media content and/or any related information (e.g., a closed caption stream, metadata, etc.) associated with the media content to STB device 306 and/or mobile device 308. Enhanced content server 304 may include or provide access to one or more enhanced content sources, such as the enhanced content sources described herein. Media content server 302, enhanced content server 304, set-top box device 306, and mobile device 308 may be configured to communicate by way of a network 312, which may include one or more of the networks described herein. In some examples, network 312 may include one or more networks associated with user 310 (e.g., one or more wireless home networks) and configured to allow STB device 306 and mobile device 308 to communicate directly. In this manner, as will be described in more detail below, media content server 302 may provide a media content instance for presentation to user 310 by way of STB device 306 (e.g., on a display device associated with STB device 306). Enhanced content server 304 may concurrently provide enhanced content associated with the media content instance to user 310 by way of mobile device 308.

Figure 4:
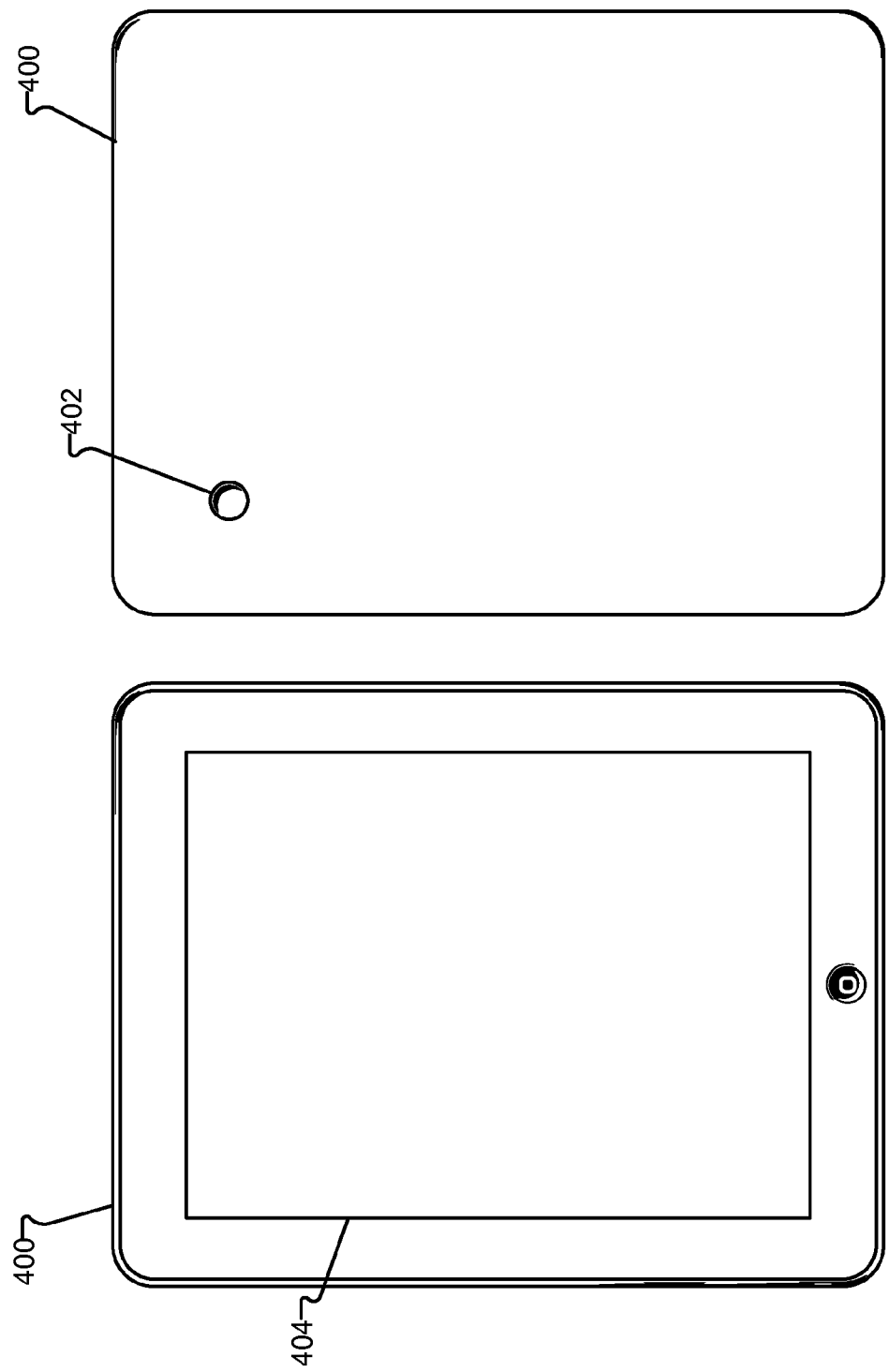
FIG. 4A illustrates a front view of an exemplary mobile device according to principles described herein.
FIG. 4B illustrates a back view of the exemplary mobile device of FIG. 4A according to principles described herein.

FIGS. 4A and 4B respectively illustrate a front view and a back view of an exemplary mobile access device 400 (or simply "mobile device 400") according to principles described herein. Mobile device 400 may represent mobile access device 308 and/or may otherwise implement one or more of facilities 102-108 of system 100.

As shown, mobile device 400 may be a tablet computer including a camera 402 by way of which a user may acquire a view of the user's physical environment and a display screen 404 by way of which mobile device 400 may display the acquired view as well as any suitable media content, display elements, enhanced content, user interfaces, applications, etc. For example, a user that is watching a media content instance on a display device may utilize camera 402 to acquire a view of at least a portion of the display device, and mobile device 400 may display the acquired view on display screen 404. In some examples, display screen 404 may be a touch screen by way of which a user may make one or more selections, provide user input, and/or navigate information and/or options (e.g., display elements) displayed on display screen 404. For example, a user may utilize display screen 404 to select a display element and access and/or interact with a corresponding enhanced content instance, as will be explained in more detail below. Although FIGS. 4A and 4B illustrate one particular mobile device, the systems and methods disclosed herein may be implemented by and/or performed in accordance with any other suitable mobile device, as may serve a particular implementation.

Figure 5:
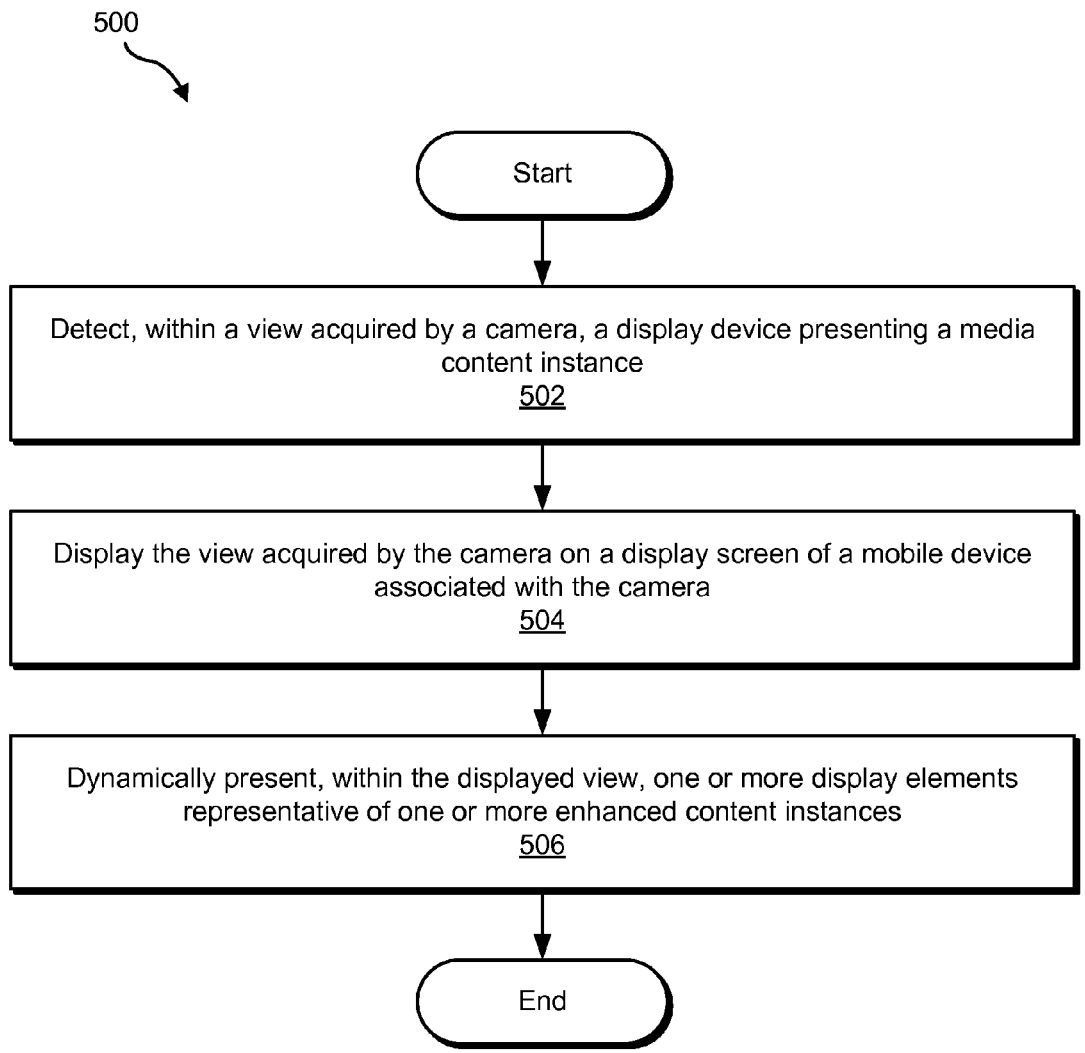
FIG. 5 illustrates an exemplary method of dynamically presenting enhanced content during a presentation of a media content instance according to principles described herein.

FIG. 5 illustrates an exemplary method 500 of dynamically presenting enhanced content during a presentation of a media content instance. While FIG. 5 illustrates exemplary steps according to one embodiment, other embodiments may omit, add to, reorder, and/or modify any of the steps shown in FIG. 5. One or more of the steps shown in FIG. 5 may be performed by any component or combination of components of system 100.

In step 502, an enhanced content presentation system detects, within a view acquired by a camera, a display device presenting a media content instance. For example, detection facility 102 may be configured to detect a display device within an acquired view in any suitable manner, such as described herein.

In step 504, the enhanced content presentation system displays the view acquired by the camera on a display screen of a mobile device associated with the camera. For example, display facility 104 may be configured to display an acquired view on a display screen in any suitable manner, such as described herein.

In step 506, the enhanced content presentation system dynamically presents, within the displayed view, one or more display elements representative of one or more enhanced content instances. For example, management facility 106 may be configured to dynamically present one or more display elements representative of any suitable enhanced content instances and presented in any suitable manner, such as described herein.

Figure 6:
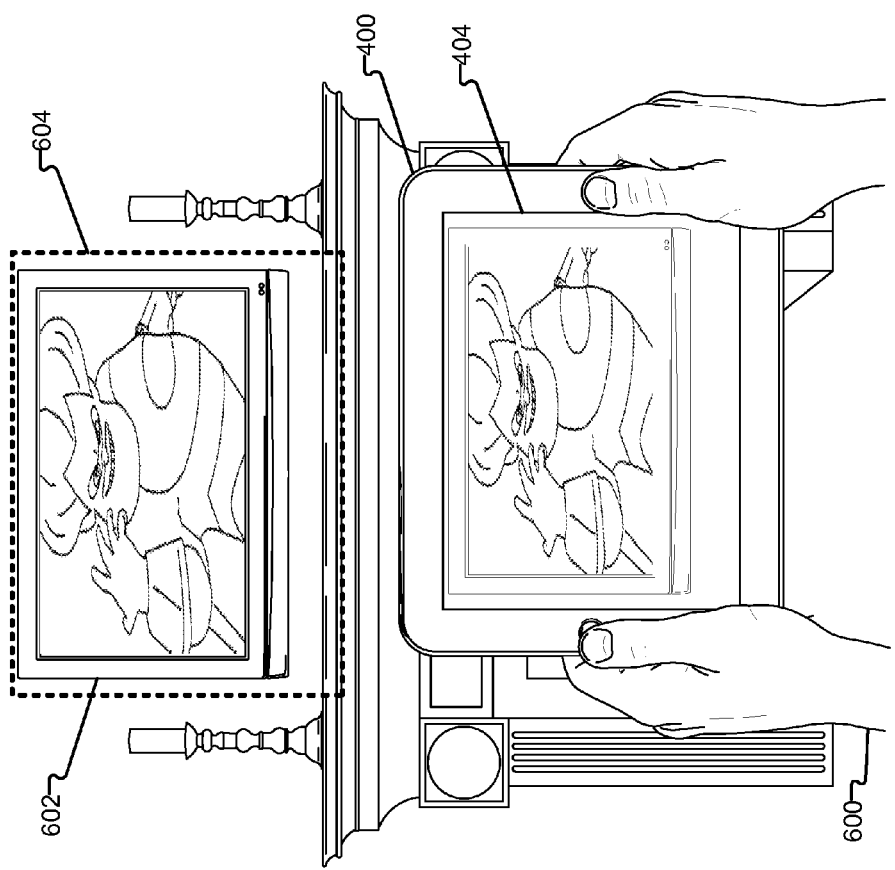
FIGS. 6-9 illustrate exemplary views of the dynamic presentation of enhanced content during the presentation of a media content instance according to principles described herein.

To illustrate the foregoing steps, FIGS. 6-9 illustrate exemplary views of a dynamic presentation of enhanced content during a presentation of a media content instance according to principles described herein. For example, FIG. 6 illustrates an exemplary view of a physical environment of a user 600 within which a display device 602 is displaying a media content instance (i.e., a movie titled "The Incredibles"). As shown, user 600 may utilize mobile device 400 (e.g., and camera 402) to acquire a view 604 of a portion of the user's physical environment including at least a portion of display device 602. Detection facility 102 may be configured to detect and/or obtain any suitable information associated with display device 602 and/or the media content instance being presented on display device 602. For example, detection facility 102 may be configured to detect the presence and/or position of display device 602 within acquired view 604 (e.g., detect the position of one or more peripheral edges of display device 602), identify information associated with the media content instance (e.g., identify "The Incredibles" as the title of the movie, identify one or more actors working in the movie, etc.), and/or detect any other suitable information as may serve a particular implementation.

Figure 7:
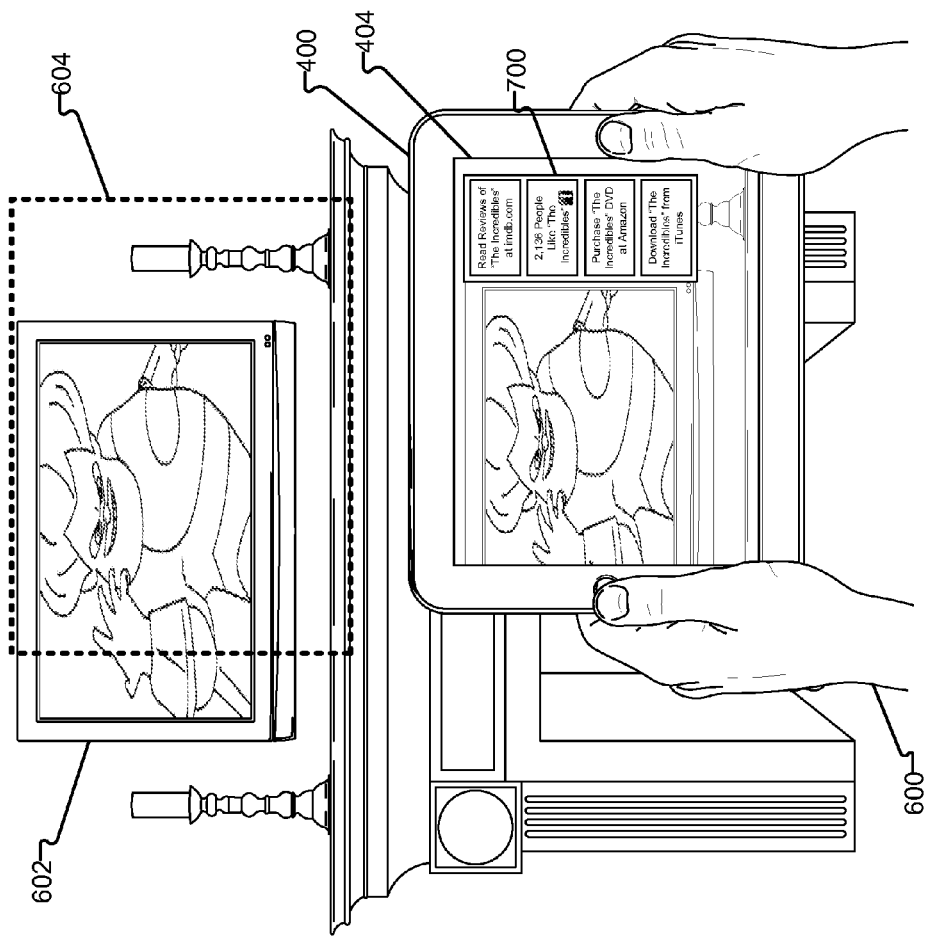

As shown in FIG. 7, user 600 may reposition mobile device 400 as desired to reposition acquired view 604. For example, as shown, user 600 may move mobile device 400 to include an area to the right of display device 602 within acquired view 604. As a result, and as mentioned above, display facility 104 may update the displayed view on display screen 404 to correspond to changes within acquired view 604.

As further shown in FIG. 7, management facility 106 may be configured to augment the reality of the user's physical environment by dynamically presenting, within the displayed view on display screen 404, a plurality of display elements 700 to the right of the depiction of display device 602 within the displayed view on display screen 404. For example, management facility 106 may present display elements 700 outside of a peripheral edge of the depiction of display device 602 within the displayed view in response to the movement of mobile device 400 by user 600.

Display elements 700 may be representative of any suitable enhanced content instances selected from any suitable enhanced content sources, such as disclosed herein. As shown, display elements 700 may be representative of enhanced content instances associated with the media content instance being presented on display device 602 (e.g., the enhanced content instances may relate to the movie being presented, one or more characters in the movie, one or more actors in the movie, a company that produced the movie, and/or to any other suitable aspect associated with the movie).

Display elements 700 may be presented in any suitable manner. For example, display elements 700 may be organized within and/or may form a virtual user interface that is overlaid onto a portion of the displayed view. Additionally or alternatively, although FIG. 7 illustrates four display elements 700, each having a rectangular configuration, organized into a columnar virtual user interface, and positioned outside a peripheral edge of display device 602, in additional or alternative examples, management facility 106 may present any suitable number of display elements, having any suitable visual appearance, being organized in any suitable manner, and/or being positioned at any suitable positions within displayed view, as may serve a particular implementation.

Figure 8:
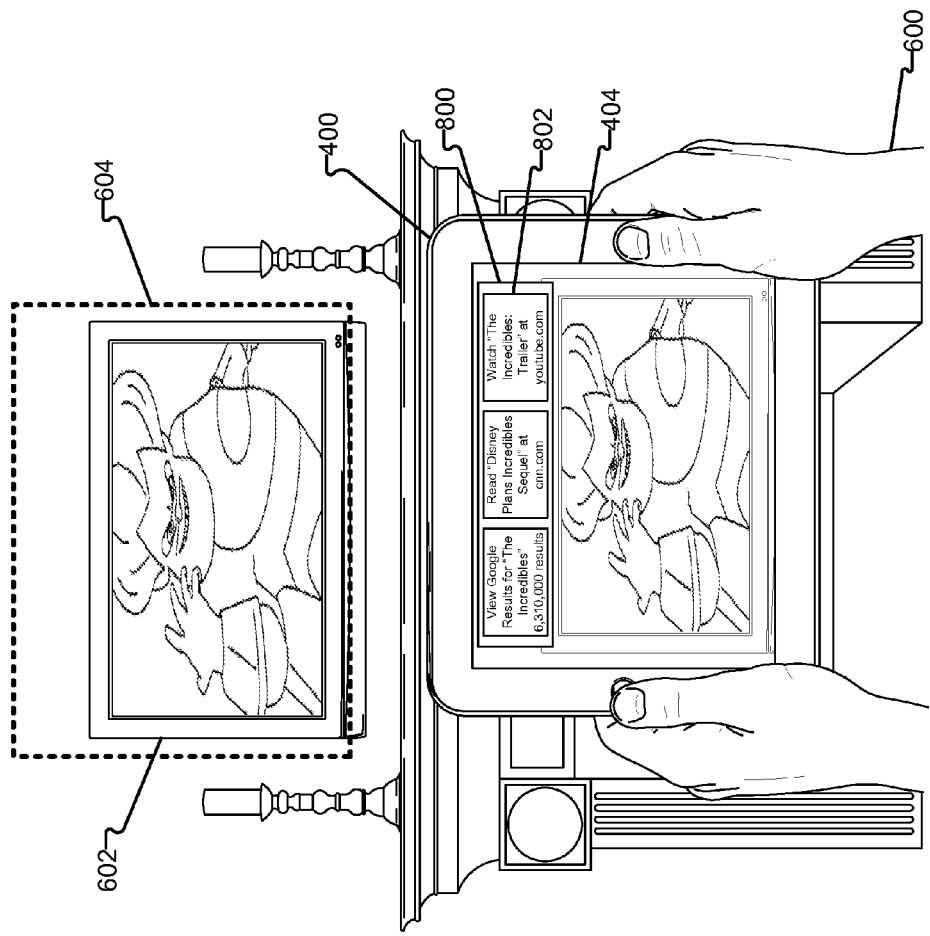

Management facility 106 may be configured to present one or more additional display elements on display screen 404 of mobile device 400. In some examples, management facility 106 may be configured to present the additional display elements in response to a repositioning of mobile device 400 by user 600. For example, as shown in FIG. 8, user 600 may move mobile device 400 to reposition acquired view 604 to include an area above display device 602. In response to the movement of mobile device 400 and/or the changes in acquired view 604, management facility 106 may remove display elements 700 and/or present a plurality of additional display elements 800 (e.g., within the area above the depiction of display device 602 on display screen 404).

Figure 9:
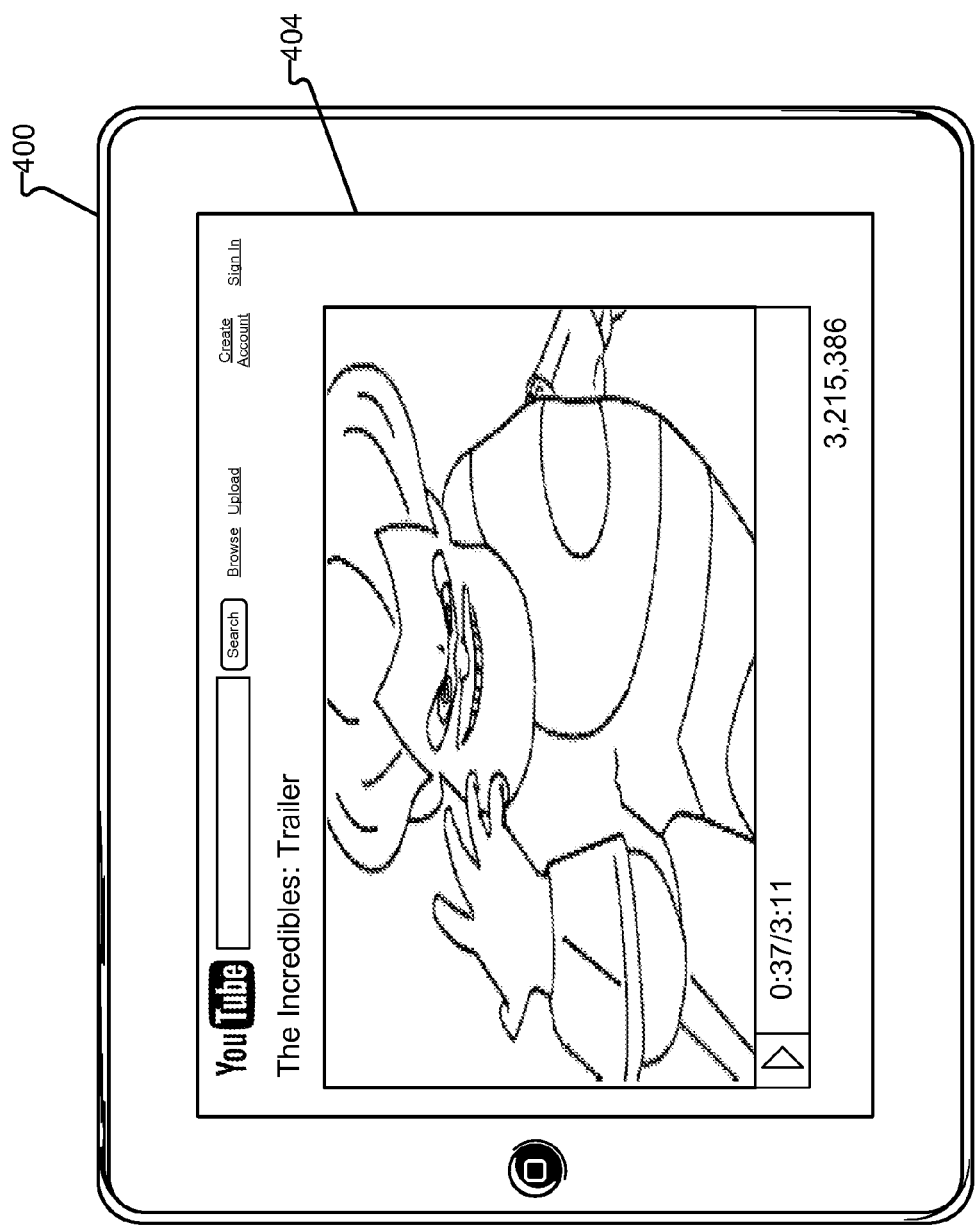

User 600 may select any one or more of display elements 700 and 800 to access the corresponding enhanced content instance(s). For example, user 600 may select a particular display element 802 within additional display elements 800 to access an enhanced content instance including a YouTube video entitled "The Incredibles: Trailer." To illustrate, as shown in FIG. 9, in response to a selection of display element 802 by user 600, management facility 106 may display the enhanced content instance associated with display element 802 on display screen 404 of mobile device 400. Accordingly, user 600 may experience and/or interact with the enhanced content instance (e.g., may visit the corresponding website and/or view the corresponding video) using mobile device 400. In additional or alternative examples, management facility 106 may be configured to display the enhanced content instance using display device 602 (e.g., in response to a request received from user 600). After interacting with the enhanced content instance, user 600 may use the foregoing steps and/or processes to access additional enhanced content as desired.

FIGS. 6-9 are provided for illustrative purposes only and are not limiting. One will appreciate that method 500 may be implemented in any other suitable manner, as may serve a particular implementation.

Figure 10:
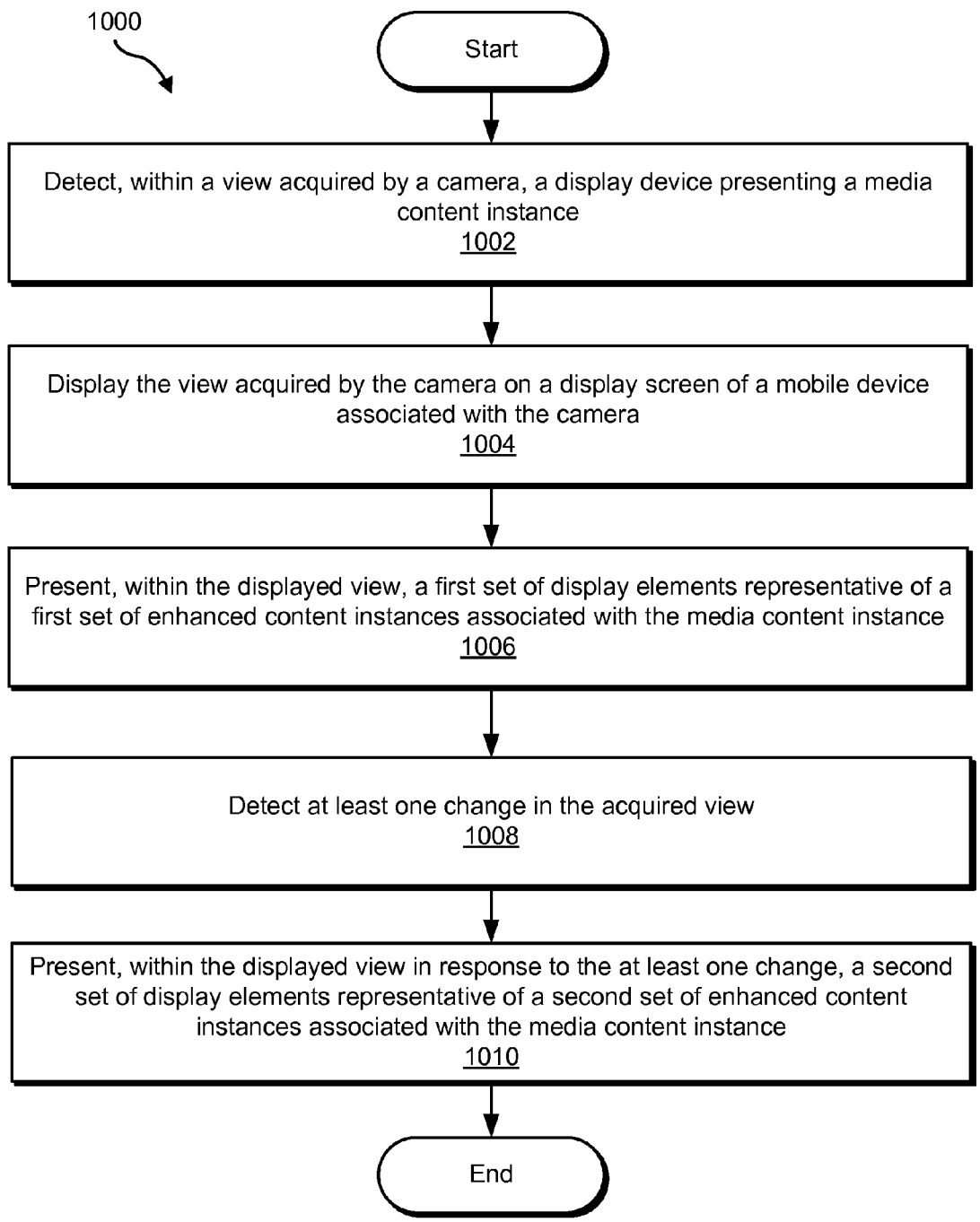
FIG. 10 illustrates another exemplary method of dynamically presenting enhanced content during a presentation of a media content instance according to principles described herein.

FIG. 10 illustrates another exemplary method 1000 of dynamically presenting enhanced content during a presentation of a media content instance. While FIG. 10 illustrates exemplary steps according to one embodiment, other embodiments may omit, add to, reorder, and/or modify any of the steps shown in FIG. 10. One or more of the steps shown in FIG. 10 may be performed by any component or combination of components of system 100.

In step 1002, an enhanced content presentation system detects, within a view acquired by a camera, a display device presenting a media content instance. For example, detection facility 102 may be configured to detect a display device within an acquired view in any suitable manner, such as described herein.

In step 1004, the enhanced content presentation system displays the view acquired by the camera on a display screen of a mobile device associated with the camera. For example, display facility 104 may be configured to display an acquired view on a display screen of a mobile device in any suitable manner, such as described herein.

In step 1006, the enhanced content presentation system presents, within the displayed view, a first set of display elements representative of a first set of enhanced content instances associated with the media content instance. For example, management facility 106 may be configured to present a first set of display elements within a displayed view in any suitable manner, such as described herein.

In step 1008, an enhanced content presentation system detects at least one change in the acquired view. For example, detection facility 102 may be configured to detect one or more changes in an acquired view in any suitable manner, such as described herein.

In step 1010, the enhanced content presentation system presents, within the displayed view, a second set of display elements representative of a second set of enhanced content instances associated with the media content instance. In some examples, the enhanced content presentation system may present the second set of display elements in response to the detection of the at least one change in the acquired view. Management facility 106 may be configured to present a second set of display elements within a displayed view in any suitable manner, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
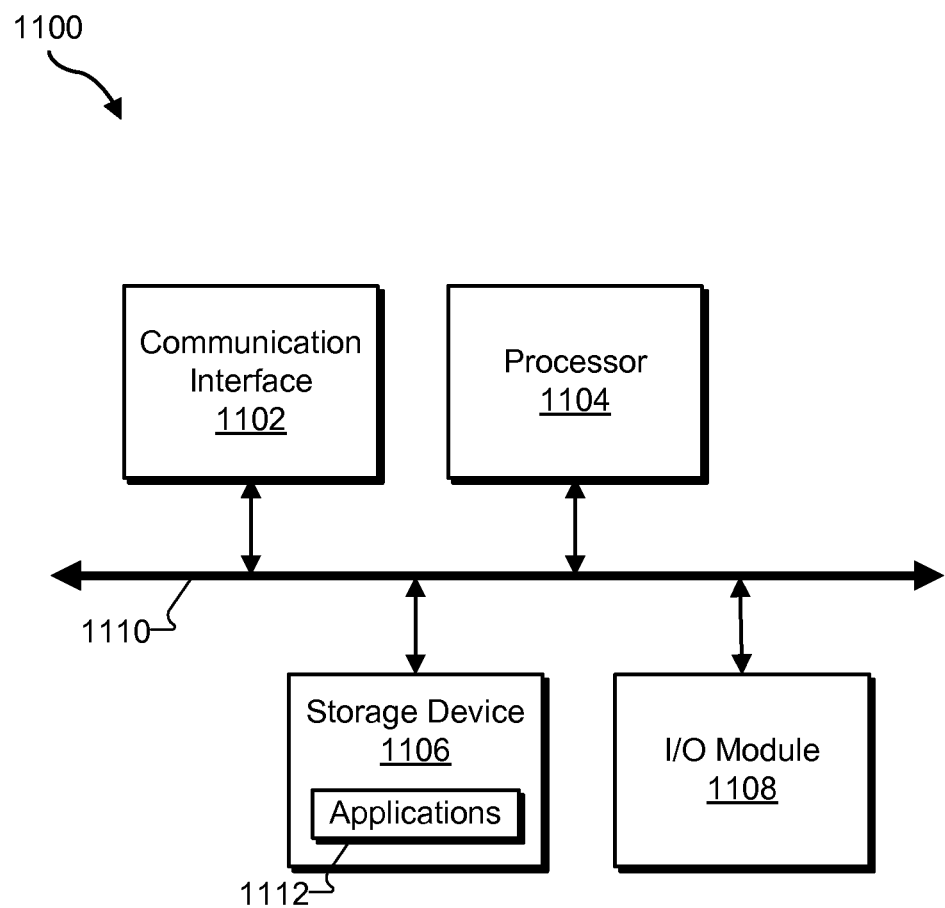
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more provisioning systems via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102, display facility 104, and/or management facility 106. Likewise, storage facility 108 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting within a view acquired by a camera, by an enhanced content presentation system, a display device presenting a media content instance and an area outside of a peripheral edge of the display device;
   displaying, by the enhanced content presentation system, a depiction of the acquired view on a display screen of a mobile device associated with the camera, the depiction of the acquired view including a depiction of the display device presenting the media content instance and a depiction of the area outside the peripheral edge of the display device;
   selecting, by the enhanced content presentation system, one or more enhanced content instances associated with the media content instance based on the detected view of the display device presenting the media content instance as acquired by the camera; and
   dynamically presenting, by the enhanced content presentation system within the depiction of the area outside the peripheral edge of the display device, one or more display elements representative of the selected one or more enhanced content instances.

2. The method of claim 1, wherein the detecting the display device comprises detecting at least one of a presence of the display device within the acquired view, a position of the display device within the acquired view, and a position of one or more peripheral edges of the display device within the acquired view.

3. The method of claim 1, further comprising detecting, by the enhanced content presentation system, at least one change in the view acquired by the camera.

4. The method of claim 3, wherein the dynamically presenting the one or more display elements comprises repositioning the one or more display elements within the displayed view in response to the at least one change.

5. The method of claim 3, wherein the dynamically presenting the one or more display elements further comprises presenting one or more additional display elements representative of one or more additional enhanced content instances in response to the at least one change.

6. The method of claim 3, wherein the detecting the at least one change comprises detecting one or more movements of the mobile device.

7. The method of claim 6, wherein the detecting the one or more movements of the mobile device comprises utilizing one or more motion sensors to detect the one or more movements.

8. The method of claim 3, wherein the detecting the at least one change comprises detecting a relative movement of the display device within the acquired view.

9. The method of claim 3, wherein the at least one change results from a repositioning of the camera by a user.

10. The method of claim 1, wherein the dynamically presenting the one or more display elements comprises presenting at least one display element within the one or more display elements at a position outside a peripheral edge of the display device within the displayed view.

11. The method of claim 1, wherein the dynamically presenting the one or more display elements comprises displaying the one or more display elements within a virtual user interface.

12. The method of claim 1, wherein the one or more display elements are overlaid onto the depiction of the area outside the peripheral edge of the display device.

13. The method of claim 1, further comprising detecting, by the enhanced content presentation system, one or more attributes associated with the media content instance.

14. The method of claim 13, wherein the one or more attributes of the media content instance comprise at least one of a video attribute, an audio attribute, a text attribute, and a metadata attribute.

15. The method of claim 13, wherein the selecting, by the enhanced content presentation system, of the one or more enhanced content instances is further based on the one or more detected attributes.

16. The method of claim 15, wherein the selecting the one or more enhanced content instances is performed in real time during the presentation of the media content instance.

17. The method of claim 13, wherein the detecting the one or more attributes comprises receiving data representative of the one or more attributes from at least one of a set-top box device associated with the display device and a content provider associated with the media content instance.

18. The method of claim 1, further comprising:
   receiving, by the enhanced content presentation system, a selection by a user of a particular display element included in the one or more display elements and representative of a particular enhanced content instance within the one or more enhanced content instances; and
   presenting, by the enhanced content presentation system in response to the selection, the particular enhanced content instance to the user.

19. The method of claim 18, wherein the particular enhanced content instance is presented by way of at least one of the mobile device and the display device.

20. The method of claim 1, further comprising:
   detecting, by the enhanced content presentation system, a transition by the display device from presenting the media content instance to presenting an additional media content instance; and
   dynamically presenting, by the enhanced content presentation system in response to the detected transition, one or more additional display elements representative of one or more additional enhanced content instances associated with the additional media content instance.

21. The method of claim 1, embodied as computer-executable instructions on at least one non-transitory computer-readable medium.

22. A method comprising:
   detecting within a view acquired by a camera, by an enhanced content presentation system, a display device presenting a media content instance and an area outside of a peripheral edge of the display device;
   displaying, by the enhanced content presentation system, a depiction of the acquired view on a display screen of a mobile device associated with the camera, the depiction of the acquired view including a depiction of the display device presenting the media content instance and a depiction of the area outside the peripheral edge of the display device;
   selecting, by the enhanced content presentation system, a first set of enhanced content instances associated with the media content instance based on the detected view of the display device presenting the media content instance as acquired by the camera;

presenting, by the enhanced content presentation system within the depiction of the area outside the peripheral edge of the display device, a first set of display elements representative of the selected first set of enhanced content instances;

detecting, by the enhanced content presentation system, at least one change in the acquired view; and presenting, by the enhanced content presentation system within the depiction of the area outside of the peripheral edge of the display device, a second set of display elements representative of a second set of enhanced content instances associated with the media content instance in response to the at least one change.

23. The method of claim 22, further comprising:

detecting, by the enhanced content presentation system, a transition by the display device from presenting the media content instance to presenting an additional media content instance; and presenting, by the enhanced content presentation system in response to the detected transition, a third set of display elements representative of a third set of enhanced content instances associated with the additional media content instance.

24. The method of claim 22, embodied as computer-executable instructions on at least one non-transitory computer-readable medium.

25. A system comprising:

a detection facility configured to detect, within a view acquired by a camera, a display device presenting a media content instance and an area outside of a peripheral edge of the display device;

a display facility communicatively coupled to the detection facility and configured to display a depiction of the acquired view on a display screen of a mobile device associated with the camera, the depiction of the acquired view including a depiction of the display device presenting the media content instance and a depiction of the area outside the peripheral edge of the display device; and an enhanced content management facility communicatively coupled to the display facility and configured to select one or more enhanced content instances associated with the media content instance based on the detected view of the display device presenting the media content instance as acquired by the camera; and dynamically present, within the depiction of the area outside the peripheral edge of the display device, one or more display elements representative of the selected one or more enhanced content instances.

* * * * *